(12) United States Patent
Abe

(10) Patent No.: US 8,253,847 B2
(45) Date of Patent: Aug. 28, 2012

(54) DIGITAL CAMERA HAVING AN AUTOMATIC FOCUS

(75) Inventor: Koichi Abe, Setagaya-ku (JP)

(73) Assignee: Nikon Corporation, Tokyo (JP)

( * ) Notice: Subject to any disclaimer, the term of this patent is extended or adjusted under 35 U.S.C. 154(b) by 17 days.

(21) Appl. No.: 13/037,026

(22) Filed: Feb. 28, 2011

(65) Prior Publication Data

US 2011/0141344 A1 Jun. 16, 2011

Related U.S. Application Data

(63) Continuation of application No. 12/078,632, filed on Apr. 2, 2008, now abandoned.

(30) Foreign Application Priority Data

Apr. 4, 2007 (JP) ................................. 2007-098136
Apr. 1, 2008 (JP) ................................. 2008-094974

(51) Int. Cl.
*H04N 5/232* (2006.01)

(52) U.S. Cl. ................... 348/345; 348/211.9; 348/222.1; 348/352; 348/353

(58) Field of Classification Search .................. 348/140, 348/208.12, 211.9, 222.1, 345, 347, 349, 348/352, 353, 356
See application file for complete search history.

(56) References Cited

U.S. PATENT DOCUMENTS

| | | | |
|---|---|---|---|
| 5,475,422 A | 12/1995 | Mori et al. | |
| 2004/0207743 A1* | 10/2004 | Nozaki et al. | 348/333.12 |
| 2005/0069208 A1 | 3/2005 | Morisada | |
| 2005/0270410 A1* | 12/2005 | Takayama | 348/345 |
| 2005/0285967 A1* | 12/2005 | Suda | 348/345 |
| 2007/0030375 A1 | 2/2007 | Ogasawara et al. | |
| 2007/0030381 A1 | 2/2007 | Maeda | |

FOREIGN PATENT DOCUMENTS

| | | |
|---|---|---|
| JP | 63-159817 A | 7/1988 |
| JP | 05-196861 A | 8/1993 |
| JP | A H05-216093 | 8/1993 |
| JP | 08-063597 A | 3/1996 |
| JP | 09-251534 A | 9/1997 |
| JP | A 2002-330335 | 11/2002 |
| JP | A 2003-75717 | 3/2003 |
| JP | 2003-315665 A | 11/2003 |
| JP | 2004-037733 A | 2/2004 |
| JP | A 2004-320287 | 11/2004 |
| JP | 2006-201282 A | 8/2006 |
| JP | 2006-319596 A | 11/2006 |

OTHER PUBLICATIONS

Office Action issued in Chinese Application No. 200810090579.X on Dec. 19, 2011. Office Action issued in Japanese Application No. 2008-094974 on Mar. 6, 2012.
Office Action in U.S. Appl. No. 12/078,632 mailed Aug. 26, 2010.

\* cited by examiner

*Primary Examiner* — Tuan Ho
*Assistant Examiner* — Kent Wang
(74) *Attorney, Agent, or Firm* — Oliff & Berridge, PLC

(57) ABSTRACT

A digital camera includes: an imaging unit that receives and images a light from a subject transmitted a photographing optical system; a recognition unit that recognizes a feature region of the subject using an image obtained by imaging with the imaging unit; a detection unit that detects a size of the feature region that is recognized with the recognition unit; and a control unit that predicts a distance to the subject after a predetermined period of time according to the size of the feature region, and controls the photographing optical system so as to focus on the subject.

17 Claims, 9 Drawing Sheets

DIGITAL CAMERA HAVING AN AUTOMATIC FOCUS

INCORPORATION BY REFERENCE

This is a continuation of application Ser. No. 12/078,632 filed Apr. 2, 2008, which claims priority to Japanese Applications Nos. JP 2007-98136 filed Apr. 4, 2007 and JP 2008-94974 filed Apr. 1, 2008. The disclosure of each of these applications is hereby incorporated by reference in its entirety.

BACKGROUND OF THE INVENTION

1. Field of the Invention

The present invention relates to a digital camera.

2. Description of Related Art

As a method of autofocus (AF) of digital cameras, a contrast detection method is heretofore known. In the contrast detection method, image signals are obtained by imaging a subject with an image sensor such as a CCD, a component of a predetermined spatial frequency band is extracted from the signals contained within a predetermined AF area within an image and a focus evaluation value is calculated by integrating its absolute value. The focus evaluation value is a value that corresponds to the contrast in the focal point detection area, and the value increases as the contrast increases. Japanese Patent Application No. 2003-315665 discloses an art that, based on characteristic that the contrast of an image becomes higher as a focus lens assumes a position closer to a focus position, the lens position at which the focus evaluation value peaks (hereafter referred to as the peak position) is determined, the peak position is judged to be the focus position, and the focus lens is driven to this focus position.

However, for detecting the peak position of the contrast, which is the focus position, the focus evaluation values are calculated at predetermined intervals, moving the focus lens along an optical axis, the focus evaluation values of those points are analyzed, and the peak position is detected. Therefore, there has been a problem that focus matching takes time and a moving subject can not be focused on.

SUMMARY OF THE INVENTION

A digital camera according to a 1st aspect of the present invention includes: an imaging unit that receives and images a light from a subject transmitted a photographing optical system; a recognition unit that recognizes a feature region of the subject using an image obtained by imaging with the imaging unit; a detection unit that detects a size of the feature region that is recognized with the recognition unit; and a control unit that predicts a distance to the subject after a predetermined period of time according to the size of the feature region, and controls the photographing optical system so as to focus on the subject.

According to a 2nd aspect of the present invention, it is preferable that the digital camera according to the 1st aspect further includes: a distance calculation unit that calculates a distance to the subject according to the size of the feature region; and a speed calculation unit that calculates a moving speed of the subject according to a temporal change of the distance to the subject, and that the control unit predicts the distance to the subject based on the distance to the subject calculated with the distance calculation unit and the moving speed of the subject calculated with the speed calculation unit.

According to a 3rd aspect of the present invention, in the digital camera according to the 2nd aspect, the distance calculation unit may calculate the distance to the subject based on position information of a lens that constitutes the photographing optical system, and after calculating the distance to the subject based on the position information of the lens that constitutes the photographing optical system, may calculate the distance to the subject from both the distance to the subject that is calculated and the size of the feature region.

According to a 4th aspect of the present invention, in the digital camera according to the 1st aspect, it is preferable that the control unit predicts the distance to the subject at a time of imaging based on a period of time between a time at which an operation is performed to execute photography and a time at which the imaging unit actually performs imaging, and controls the photographing optical system so as to focus on the subject at the time of imaging with the imaging unit.

According to a 5th aspect of the present invention, the digital camera according to the 1st aspect may further include a registration unit that selects the feature region of the subject for predicting the distance to the subject, from at least one said feature regions that are recognized with the recognition unit, and registers feature information of the selected feature region of the subject; and after registration of the selected feature information of the feature region of the subject, the recognition unit may recognize the feature region of the subject based on the registered feature information of the feature region of the subject.

According to a 6th aspect of the present invention, the digital camera according to the 5th aspect may further include a record control unit that stores an image that is obtained by imaging with the imaging unit in a recording medium, and the registration unit may register the feature information of the feature region of the subject based on the image that is stored in the recording medium.

According to a 7th aspect of the present invention, in the digital camera according to the 5th aspect, it is preferable that the feature information of the feature region includes at least one of position information of a lens that constitutes the photographing optical system, the distance to the subject, and the size of the feature region.

According to a 8th aspect of the present invention, in the digital camera according to the 4th aspect, a photographing condition may be modified in response to a calculation result of one of the distance calculation unit and the speed calculation unit.

According to a 9th aspect of the present invention, in the digital camera according to the 8th aspect, the photographing condition may be one of shutter speed and ISO speed.

According to a 10th aspect of the present invention, in the digital camera according to the 1st aspect, it is preferable that the control unit predicts the distance to the subject after the predetermined period of time based on sizes of a plurality of the feature regions, which exist on a plurality of images obtained in chronological order with the imaging unit.

DESCRIPTION OF PREFERRED EMBODIMENTS

The First Embodiment

The first embodiment of the present invention is described hereinafter.

Figure 1:
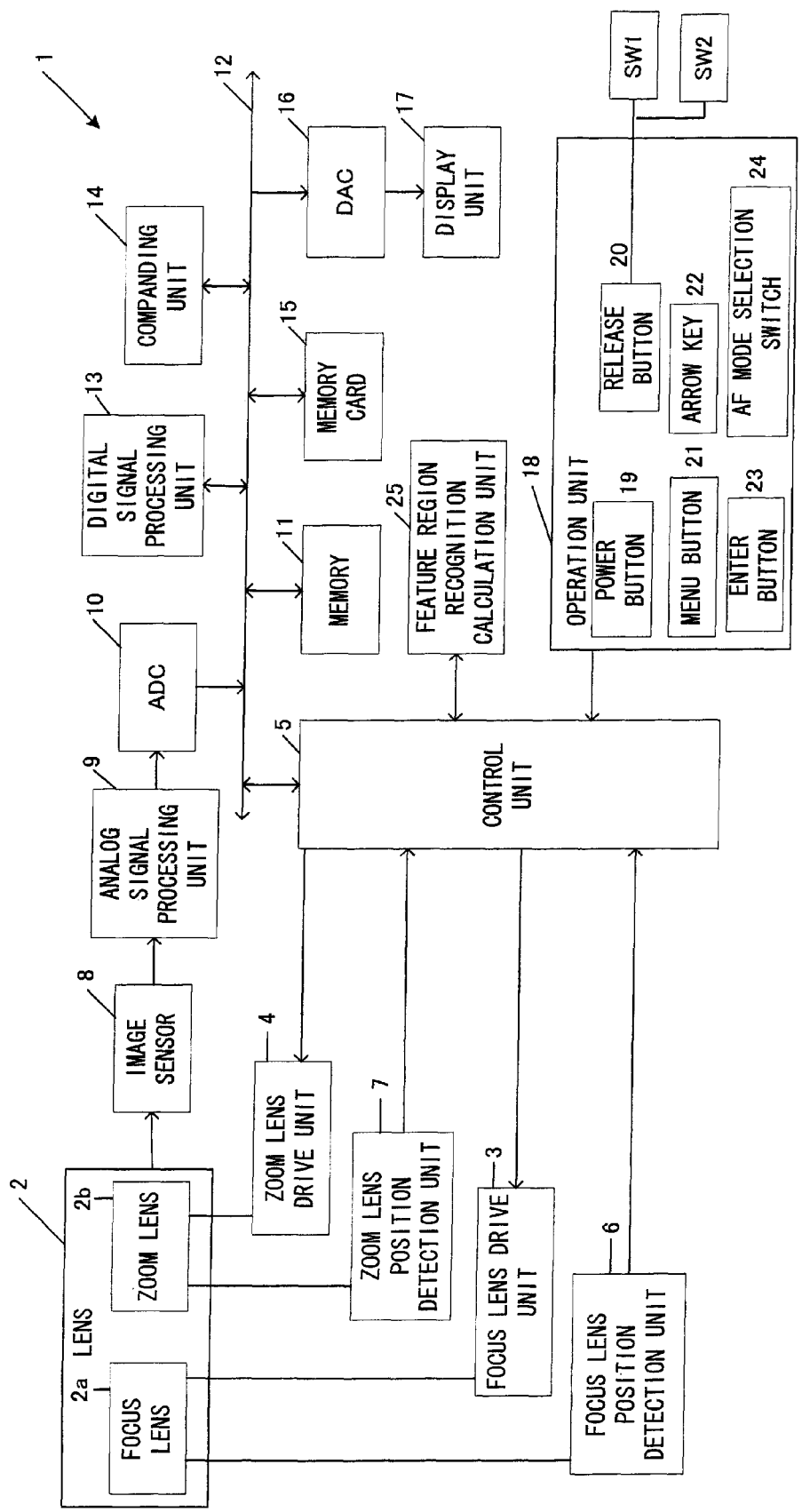
FIG. 1 is a block diagram that shows an electrical configuration of a digital camera 1 in accordance with a first embodiment of the present invention.

FIG. 1 is the block diagram that shows the electrical configuration of a digital camera 1 in accordance with the embodiment.

A Lens 2 includes a focus lens 2a and a zoom lens 2b, and constitutes a photographing optical system. The focus lens 2a is a lens for focusing on a subject, and is moved along the optical axial direction by a focus lens drive unit 3. The zoom lens 2b is a lens for modifying a focal length of the lens 2, and is moved along the optical axial direction by a zoom lens drive unit 4. Each of the focus lens drive unit 3 and the zoom lens drive unit 4 is composed of a stepper motor, and is controlled depending on a instruction from a control unit 5. A focus lens position detection unit 6 detects a position on the optical axis of the focus lens 2a, and sends a detection signal to the control unit 5. A zoom lens position detection unit 7 detects a position on the optical axis of the zoom lens 2b, and sends the detection signal to the control unit 5.

A light from the subject forms an image on an image sensor 8 through the lens 2. The image sensor 8, which is a solid-state image sensor such as a CCD or a CMOS, outputs an image signal that a subject image is photoelectrically converted into an electrical signal to an analog signal processing unit 9. The image signal, which is an analog signal that is input to the analog signal processing unit 9, is subjected to processing such as correlated double sampling (CDS) and is input to an analog-digital converter (ADC) 10. And, the image signal is converted from the analog signal to a digital signal with the ADC 10, and is stored in a memory 11. The memory 11 includes a buffer memory in which the image signal is temporarily stored, an embedded memory in which photographed image data is recorded, etc. The image data that is stored in the memory 11 is sent to a digital signal processing unit 13 through a bus 12. The digital signal processing unit 13, which is, for example, a digital signal processor (DSP), performs known image processings such as white balance processing, interpolation processing, and gamma correction, for the image data, and stores the image data in the memory 11 again.

The processed image data is subjected to known compression processing such as by JPEG with a companding unit 14, and is recorded in a memory card 15, which is removable into or out of the digital camera 1. In the case of reproducing and displaying the image recorded in the memory card 15, the image recorded in the memory card 15 is read out in the memory 11, digital image is converted into analog image with a digital-analog converter (DAC) 16, and the image is displayed on a display unit 17. The display unit 17, which is, for example, a liquid crystal display, reproduces and displays images recorded in the memory card 15, and displays an image that is imaged with the image sensor 8 at the time of photographing as a through image. The image data can be recorded in the memory card 15 or the embedded memory in the memory 11. However, when the embedded memory is used, the memory card 15 is not used.

The control unit 5 is connected to an operation unit 18. The control unit 5 includes, for example, a CPU, and controls the digital camera 1 in response to signals input from the operation unit 18. The operation unit 18 includes a power button 19, a release button 20, a menu button 21, an arrow key 22, an enter button 23, an AF mode selection switch 24, etc.

The power button 19 is a button for switching the digital camera 1 to be powered on (ON) and off (OFF).

The release button 20 is a button that a user presses down in order to instruct imaging. Pressing the release button 20 halfway down causes a halfway-press switch SW1 to be powered on (ON) and causes an ON signal to be output, while not pressing the release button 20 halfway down causes the halfway-press switch SW1 to be powered off (OFF) and causes an OFF signal to be output. The signal that the halfway-press switch SW1 outputs is input to the control unit 5. Pressing the release button 20 down fully (pressing the button down deeper than in the case of the halfway-press operation) causes a fully-press switch SW2 to be powered on (ON) and causes the ON signal to be output, while not pressing the release button 20 down fully causes the fully-press switch SW2 to be powered off (OFF) and causes the OFF signal to be output. The signal that is output from the fully-press switch SW2 is input to the control unit 5.

The menu button 21 is a button for displaying a menu corresponding to a mode that has been selected by the user.

The arrow key 22 is a button for selecting an operation that the user wants to perform, such as moving a cursor in the vertical direction and the horizontal direction for selecting items displayed on the display unit 17.

The enter button 23 is a button for determining the operation selected with the arrow key 22.

Figure 3:
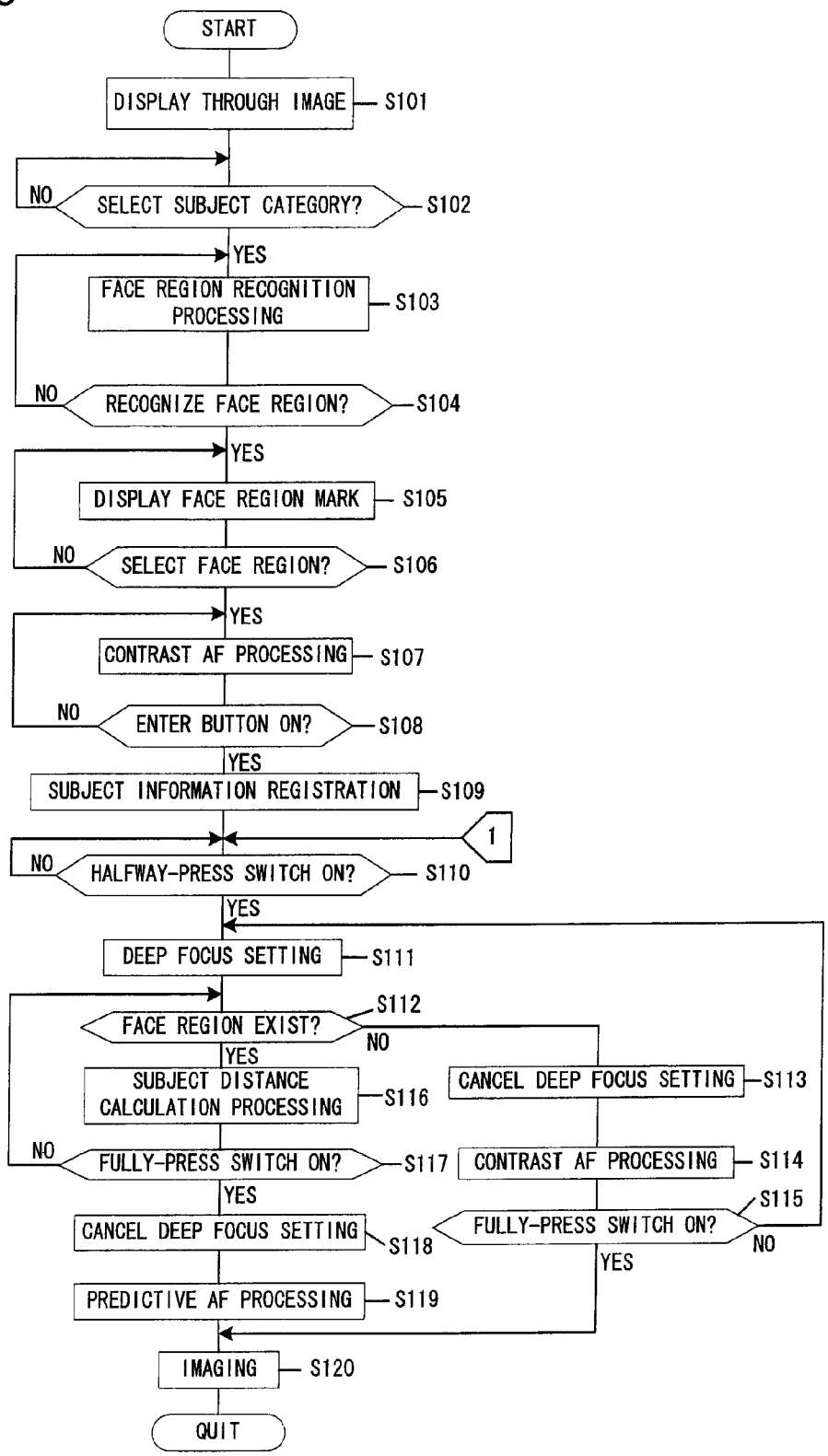
FIG. 3 is a flow chart that shows a photographing procedure in a predictive AF mode in accordance with the first embodiment of the present invention.

The AF mode selection switch 24 is a switch for selecting whether or not imaging in the predictive AF mode. The predictive AF mode, which is an imaging mode that is carried out with the AF mode selection switch 24 powered on (ON), is an operation described hereinafter in FIG. 3. FIG. 3 and predictive AF processing are hereinafter described in full. When the AF mode selection switch 24 is powered on (ON), a mode is switched to the predictive AF mode; while, when the AF mode selection switch 24 is powered off (OFF), a mode is switched to the conventional contrast AF mode as shown in description of related art.

A feature region recognition calculation unit 25 recognizes a feature region from the image data. If the recognition succeeds, outputs coordinates that indicate the position and the size of the recognized feature region to the control unit 5.

Once the coordinates that indicate the position and the size of the recognized feature region is input, the control unit 5, in response, creates an image on which a frame that indicates the size of the feature region (feature region mark) is superimposed on an image for displaying a through image, and displays the created image on the display unit 17. The calculation for recognizing the feature region may as well be configured to be performed at the control unit 5.

The digital camera 1 in accordance with the first embodiment of the present invention recognizes the feature region from the image that is imaged with the image sensor 8, consecutively detects the size of the feature region that is specified by the user, and calculates the subject's movement from a change in size of the feature region. And, the digital camera 1, based on the result, predicts the distance to the subject at the time of imaging, and controls the drive position of the focus lens 2a so that the subject is focused on.

A method for recognizing the feature region is hereinafter described. In the case where, for example, the subject is a person, a face of the person is recognized as the feature region. The feature region recognition calculation unit 25 detects whether or not the face of the person exists on the through image that is displayed on the display unit 17. A method for detecting the person's face includes, for example, detecting flesh color from the image, and extracting a candidate region that corresponds to a shape of the face and determines the face region from within the region. A method for person recognition includes, for example, identifying the person by means of matching an image in which each feature point such as an eye, an ear, a mouth, etc. is extracted from the image to a dictionary image of each person that has been registered. If the recognition of the face of the person succeeds using the known method, coordinates that indicate the position and the size of the recognized face region is output to the control unit 5.

Figure 2:
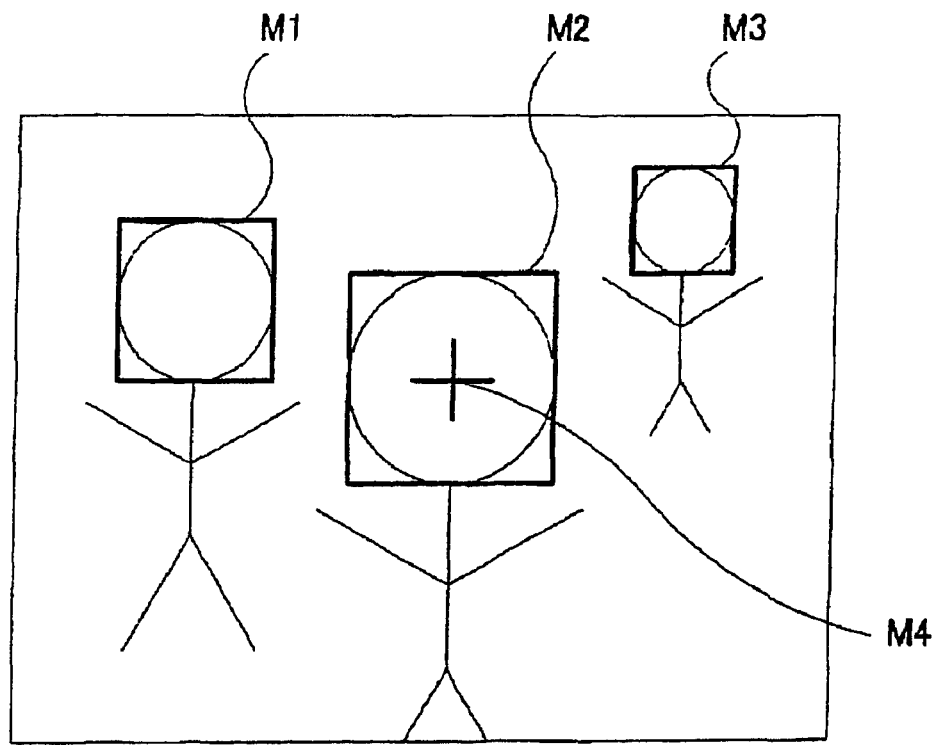
FIG. 2 is a figure that shows face region marks that are displayed on faces of persons who are subjects in accordance with the first embodiment of the present invention.

In the case where a plurality of persons are recognized, as hereinafter described, a person who is to be focused on is specified among the plurality of persons. The control unit 5, according to the coordinates that is input from the feature region recognition calculation unit 25, controls the display unit 17, and displays the frame that indicates the feature region (feature region mark) superimposing on the through image, as illustrated in FIG. 2. In the case where only one face is detected with the feature region recognition calculation unit 25, the feature region mark is displayed on the face region. In the case where a plurality of faces is detected with the feature region recognition calculation unit 25 as illustrated in FIG. 2 (three faces in FIG. 2), the feature region marks M1 to M3 are displayed on each of the face regions.

The registration method for the feature region and the prediction method for the distance to the subject is described hereinafter.

FIG. 3 is a flow chart that shows the photographing procedure in the predictive AF mode. Processing shown in FIG. 3 is performed with the control unit 5. The case in which a plurality of persons exist in the through image and the person who is to be consecutively focused on is selected among the persons, and is imaged is described in accordance with the embodiment.

If the AF mode selection switch 24 is switched ON with the power button 19 of the digital camera 1 switched ON, a predictive AF program, which performs operations shown in FIG. 3, is executed.

A step S101 to a step S105 are steps that relate to recognition of the feature region.

At the step S101, if the AF mode selection switch 24 is switched ON, the through image is displayed on the display unit 17: image that is repeatedly imaged with the image sensor 8 is continuously updated and displayed on the display unit 17 as the through image.

At the step S162, once the menu button 21 is pressed down with the through image displayed on the display unit 17, the control unit 5 sends an instruction to the display unit 17, for displaying a screen for selecting a category of the subject that is to be recognized, superimposing on the through image, on the display unit 17. As the category of the subject, something that moves in itself, such as a person, a soccer ball, and a car, is displayed on the select screen. The user selects the category of the subject in the select screen by operating the arrow key 22, determines the same by pressing down the enter button 23. If the enter button 23 is not ON, the selection at the step S102 is repeated until the enter button 23 is turned ON. If the enter button 23 is turned ON, the operation proceeds to the step S103. Since the subject in accordance with the embodiment is a person, the case that the person is selected as the category of the subject is described hereinafter.

Once the category of the subject to be recognized is selected, at the step S103, the control unit 5 sends the feature region recognition calculation unit 25 an instruction for initiating the feature region recognition processing to the through image. Here, since the person is selected as the category of the subject at the step S102, face region recognition processing, in which a face of a person is to be recognized as the feature region, is initiated.

At the step S104, the control unit 5 determines whether or not the face region has been recognized, in response to a result of the face region recognition at that time from the feature region recognition calculation unit 25. In the case where the face region is not recognized for some reason such as that any face region does not exist in the through image, that the face region exists in the through image but is too small, or else, the operation returns to the step S103, and performs the face region recognition processing again. In the case where the face region is recognized, the operation proceeds to the step S105, where the control unit 5 sends an instruction to the display unit 17, for displaying the face region marks M1 to M3 on the display unit 17, superimposing on the through image, as illustrated in FIG. 2.

Hereat, a cross-shaped mark M4 for selecting the face region is displayed on the display unit 17, as hereinafter described in detail. The cross-shaped mark M4 is displayed only within the face region mark M1 that is the closest to the center of the through image that is displayed on the display unit 17. In other words, if only one face region mark exists, the cross-shaped mark is displayed within the face region mark; on the other hand, if a plurality of face region marks exist, the cross-shaped mark is displayed only within the face region mark that is the closest to the center of the through image that is displayed on the display unit 17.

A step S106 to a step S109 are steps that relate to registration of the face region.

At the step S106, the face region of the subject is selected. With a plurality of the face region marks M1 to M3 displayed on the through image as illustrated in FIG. 2, the user selects the face region mark that the user wants to register among the face region marks M1 to M3, by operating the arrow key 22. Hereat, the cross-shaped mark M4 indicates the face region mark that is selected at the time. (FIG. 2 shows that the face region mark M2 is selected.) If the user operates the arrow key 22 in the vertical direction and the horizontal direction, the cross-shaped mark M4 jumps from the face region mark where the cross-shaped mark M4 is displayed to other face region mark. For example, with the face region mark M2 selected as illustrated in FIG. 2, if the user presses down the left key of the arrow key 22, the cross-shaped mark M4 jumps from the face region mark M2 to the face region mark M1.

With the cross-shaped mark M4 superimposed on the face region mark of the subject, the user presses down the enter button 23 to determine. Once the face region mark is selected, the feature region recognition calculation unit 25 extracts the feature points such as the eye, the ear, the mouth, etc. in the selected face region. An adjacent region that includes the feature points (the feature points adjacent region that includes the eye region, the ear region, the mouth region, etc.) is registered in the memory 11 as a template. Once the face region mark is selected, the through image is displayed on the display unit 17. Then, the feature region recognition calculation unit 25 extracts the feature points adjacent region from the face region that is recognized on the through image. The control unit 5 performs matching the feature points adjacent region extracted from the through image to the template that has been registered, that is, calculation of similarity.

In response to the result of the calculation of similarity, the control unit 5 sends the display unit 17 the instruction for executing displaying the face region mark in the feature points adjacent region whose similarity to the template is determined to be high; meanwhile, the control unit 5 sends the display unit 17 the instruction for cancelling displaying the face region mark in the feature points adjacent region whose similarity to the template is determined to be low.

Consequently, after selecting the face region mark, the face region mark is displayed only on the face region that matches to the selected face region among the regions on the through image and any face region mark is not displayed in other face regions. A method for selecting the feature region is not limited to those heretofore described: the face region mark may as well be configured to be selected by holding down the face region mark with a finger, etc., for example, using the display unit 17 with which a touch screen is equipped, instead that the user operates the arrow key 22 for selecting the face region mark. If the selection for the face region is not made at the step S106, the operation returns to the step S105.

If the face region is selected, the operation proceeds to the step S107. At the step S107, inputting the ON signal of the halfway-press switch SW1 by the user's operation of halfway-pressing the release button 20 to the control unit 5 causes the AF processing to be performed to the face region selected at the step S106. This AF processing is of the conventional contrast AF as described in background of the invention. Once the face region is focused on, at the step S108, whether or not the enter button 23 is pressed down with the face region focused on is determined. If the enter button 23 is not pressed down, the operation returns to the step S107 and performs the AF processing again. If the enter button 23 is pressed down, the operation proceeds to the step S109.

At the step S109, the control unit 5 registers information about the subject that has been determined at the step S108 in the memory 11. The information about the subject includes position information of the lens 2 at the time of determining the face region at the step S108, distance (subject distance) to the subject (the face region) calculated according to the position information of the lens 2, and the size of the face region mark. The position information of the lens 2, which is information about the position of the focus lens 2a and the zoom lens 2b on the optical axis, is obtained with the focus lens position detection unit 6 and the zoom lens position detection unit 7. The detection signals are output to the control unit 5. Once the detection signals are input, the control unit 5 calculates the subject distance according to the detection signals. The size of the face region is designated either to be a length of one of a vertical side and a horizontal side of the face region mark, which is displayed in rectangular shape, or to be the combination of the sides. This determines the relation between the predetermined subject distance and the size of the face region. Upon completion of the registration of the information about the subject, the through image is displayed on the display unit 17.

A step S110 to a step S120 are steps that relate to photographing.

At the step S110, whether or not the halfway-press switch SW1 of the release button 20 is ON is determined. If the halfway-press switch SW1 of the release button 20 is OFF, the determination of the step S110 is repeated until the halfway-press switch SW1 is turned ON. If the halfway-press switch SW1 of the release button 20 is ON, the operation proceeds to the step S111.

When the halfway-press switch SW1 of the release button 20 is ON, at the step S111, an aperture value is set to a minimum or close to the minimum of an aperture, which is not figured herein, in other words, set to deep focus. This is carried out in order that deepening a depth of field causes the moving subject, particularly the face region, to be widely recognized to the optical axis, since the moving subject, particularly the face region, is to be recognized in the subject distance calculation processing at the step S116 that is described hereinafter. Hereat, the focus lens 2a is driven so as to correspond to a hyperfocal distance. The hyperfocal distance is the shortest subject distance among the subject distances that are included in the depth of field at the deep focus photographing. Hereat, the depth of field may as well be configured to be user-settable in accordance with a photographic composition of the subject, and the focus lens 2a may as well be configured to be driven corresponding to the depth of field.

At the step S112, whether or not the face region registered at the step S109 exists in the through image is determined. In the case where the registered face region does not exist in the through image, the operation proceeds to the step S113. At the step S113, the control unit 5 cancels the deep focus setting by resetting the aperture value that has been set at the step S111, and sets the aperture value for correct exposure to the subject that exists in the through image. At the step S114, the predictive AF mode is switched to a normal AF mode such as the conventional contrast AF as described in background of the invention. For example, in the case a landscape such as a mountain is being displayed as the through image, the focus lens 2a is driven for focusing on infinity. At the step S115, whether or not the fully-press switch SW2 of the release button 20 is ON is determined.

If the fully-press switch SW2 is OFF, the operation returns to the step S111, where the aperture value is set to the minimum or close to the minimum of the aperture, which is not figured herein. If the fully-press switch SW2 is ON, the operation proceeds to the step S120.

On the other hand, at the step S112, if the registered face region exists in the through image, the operation proceeds to the step S116 after displaying the face region mark on the registered face region, to start the subject distance calculation processing. The subject distance at this time is calculated by assigning parameters of the size of the face region mark and of the focal length of the lens 2 to a predetermined arithmetic expression. A table in which the relation between the size of the face region mark and the focal length of the lens 2 correspond to the subject distance may as well be created in advance and stored in the memory 11, so that the subject distance is calculated by referring to the table.

As long as the face region is detected, the face region mark is displayed by tracking the face region in order to be superimposed on the face region even if the face region moves.

Here, at the step S111, since the focus lens 2a is driven so as to correspond to the hyperfocal distance, the focus lens 2a is not driven even if the halfway-press switch SW1 of the release button 20 is ON. The focus lens 2a, however, may as well be driven so as to focus in response to the motion of the subject. This processing is hereinafter described in accordance with the fourth embodiment. After the face region is determined to exist at the step S112, the setting for said deep focus is retained until the setting for the deep focus is cancelled at the step S118.

At the step S116, for each image that has been imaged with the imaging sensor 8 in chronological order (for example, 30 frames per second), information of the size of the face region mark and the focal length of the lens 2 is obtained, and the subject distance is calculated. In the case where the focal length of the lens 2 is same as at the time of registering the face region at the step S109, if the size of the face region mark displayed on the through image is smaller than the size of the face region mark at the time of registering the face region, the subject distance is recognized to be longer than the subject distance at the time of registering the face region.

On the other hand, if the size of the face region mark displayed on the through image is bigger than the size of the face region mark at the time of registering the face region, the subject distance is recognized to be shorter than the subject distance at the time of registering the face region. The obtained subject distance is recorded in the memory 11. The subject distance that is recorded in the memory 11 is of a plurality of frames, and the subject distance in the memory 11 is sequentially updated every time an image is imaged with the imaging sensor 8 in chronological order.

Figure 4:
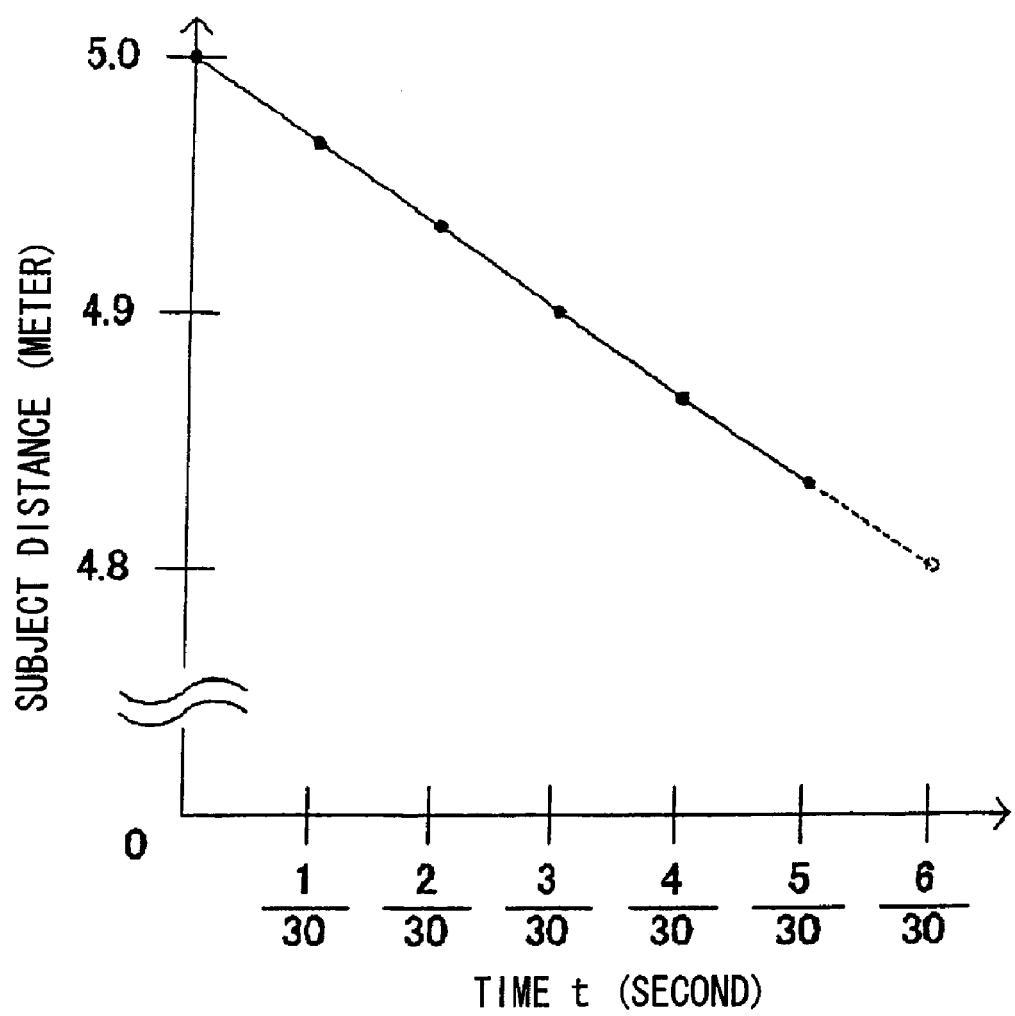
FIG. 4 is a graph that shows an example of relation between temporal change of subject distance and subsequent subject distance with reference to a plurality of frames in accordance with the first embodiment of the present invention.

A moving speed of the subject is calculated from temporal change of the subject distance of the plurality of frames that is recorded in the memory 11, and the subsequent subject distance is calculated. A description is given in FIG. 4, with a subject person being person A herein, supposing that the vertical length of the face region is a and the calculated subject distance is 5 meters at 0 seconds (t=0). The subject is travelling thereafter at a certain speed, and the vertical length of the face region is b, which is longer than a, and the calculated subject distance is 4.83 meters at 5/30 seconds (t=5/30). The moving speed of the subject is 1 meter per second, supposing that the focal length of the lens 2 has not changed during that time. Consequently, the subject is predicted to be at a position of 4.80 meters of the subject distance at 6/30 seconds (t=6/30). The calculation of the subject distance is repeated until the release button 20 is pressed down fully.

At the step S117, whether or not the fully-press switch SW2 of the release button 20 is ON is determined. If the fully-press switch SW2 of the release button 20 is OFF, the operation returns to the step S112 and determines again whether or not the registered face region exists in the through image. If the fully-press switch SW2 of the release button 20 is ON, the operation proceeds to the step S118.

At the step S118, the deep focus setting is cancelled by resetting the aperture value that has been set at the step S111, and the aperture value is set for correct exposure to the subject.

At the step S119, the predictive AF processing is performed to the subject. With reference to a camera with AF function, an interval between the user's pressing the release button 20 down fully and the imaging is actually performed (hereafter referred to as release time lag) often matters. There has been a problem that images are out of focus, in particular when the subject is in motion, since the focus position to the subject is changed during the release time lag. Hereat, the focus position to the subject after the release time lag is predicted from the moving speed of the subject according to the result of the subject distance calculation processing at the step S116; the focus lens 2a is moved for focusing on the predicted focus position so as to optimize the focus for the subject. The release time lag is designated to be 0.01 seconds in accordance with the embodiment: the position of the subject at 0.01 seconds after the release button 20 is pressed down fully is predicted, and a photography is performed after focusing on the predicted subject position.

Figure 5A:
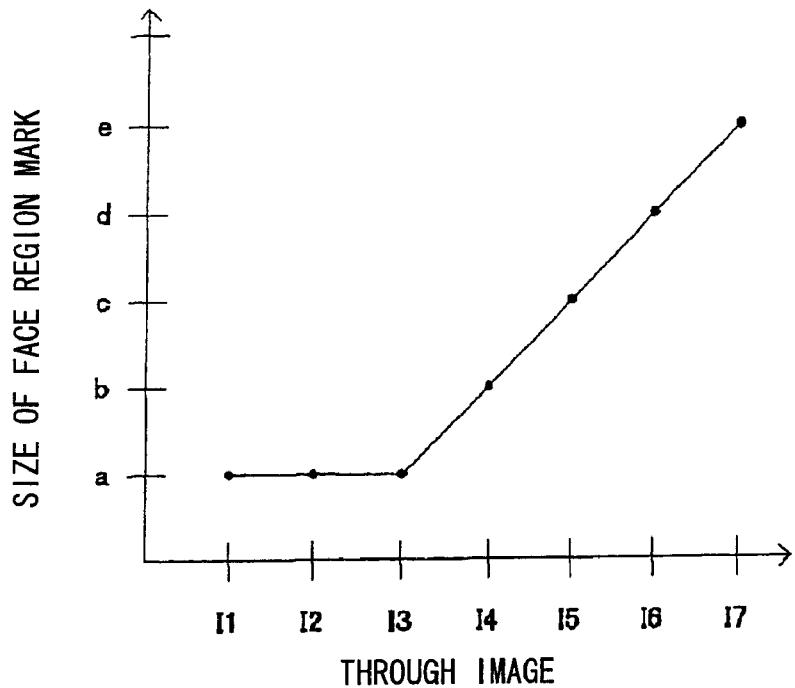
FIG. 5 shows a graph that shows an example of relation between a through image and the size of the face region mark, and a graph showing an example of relation between a through image and the subject distance in accordance with the first embodiment of the present invention.
Figure 5B:
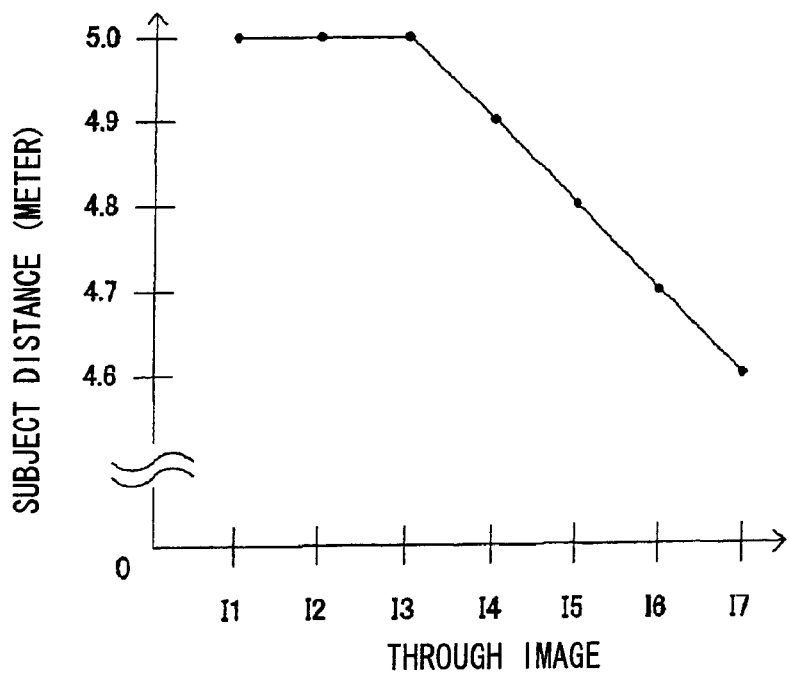

FIGS. 5A and 5B are graphs that show examples of the predictive AF processing at the step S119. Herein, the motion of the subject, which is a person B, is shown.

FIG. 5A is the graph that shows the temporal change in the size of the face region mark of the person B. Here, the size of the face region mark is designated to be the vertical side of the face region mark. The horizontal axis represents the numbers that are numbered to each image that has been imaged with the imaging sensor 8 in chronological order (the through image I1 to the through image I7). These images are obtained at 30 frames per second: one scale on the horizontal axis indicates 1/30 seconds. The vertical axis indicates the size of the face region mark.

FIG. 5B is the graph that shows the temporal change in the subject distance of the person B. The horizontal axis, as in FIG. 5A, represents the numbers that are numbered to each image that has been imaged with the imaging sensor 8 in chronological order, and one scale on the horizontal axis indicates 1/30 seconds. The vertical axis indicates the subject distance of the person B. The subject distance, as described above, is calculated according to the size of the face region mark and the focal length of the lens 2.

The motion of the person B is described as follows. The size of the face region mark is a at the time of the through image I1 (FIG. 5A), and the subject distance of the person B is 5.0 meters (FIG. 5B). Likewise, since the size of the face region mark remains a, even in the through image I2 and the through image I3 (FIG. 5A), the subject distance of the person B remains 5.0 meters (FIG. 5B). In the through image I4, on the other hand, since the size of the face region mark is changed to b, which is bigger than a (FIG. 5A), the subject distance of the person B becomes shorter to 4.9 meters (FIG. 5B). In the through image I5, the through image I6, and the through image I7, the size of the face region mark becomes bigger to c, d, and e, respectively, proportionately with time (FIG. 5A), the subject distance of the person B is 4.6 meters at the time of the through image I7. Consequently, the person B is determined to be moving closer to the camera at the moving speed of 3.0 meters per second.

Supposing that the release button 20 is pressed down fully at the time of the through image I7, in response to the fully-press signal, the control unit 5 calculates the position of the person B at 0.01 seconds after the imaging, that is, the release time lag, based on the subject distance of the person B and the moving speed. Consequently, the position of the person B at the time of imaging is predicted to be 4.57 meters, as a following expression: 4.6 m+(−3.0 m/sec)×0.01 sec. The control unit 5, in response to the calculation result for the subject distance, sends the focus lens drive unit 3 the instruction for driving the focus lens 2a so that the position of 4.57 meters of the subject distance is focused on. Then, the focus lens drive unit 3, in response to the instruction from the control unit 5, drives the focus lens 2a.

At the step S120, imaging is carried out with the imaging sensor 8. Hereat, exposure conditions for the digital camera 1 may as well be modified according to the motion of the subject. In the case where, for example, the moving speed of the subject is fast, shutter speed is made faster, or ISO speed is made increased.

In accordance with the embodiment, which is described above, the following operational effects can be achieved.

Calculating the size of the feature region and the distance between the focal length of the lens 2 and the subject for each image that has been imaged with the imaging sensor 8 in chronological order causes the distance to the subject at the time of imaging to be predicted, and the focus lens 2a to be driven for focusing on the subject. This enables the moving subject to be photographed while being focused more accurately.

The feature region that the user selects, of at least one feature region recognized from the image, is registered. This causes the predictive AF to be performed to the subject having the registered feature region, even if a plurality of subjects exist at the time of imaging; therefore, the subject having the registered feature region can be always focused, without any other subject that is not registered being focused.

When displaying the through image of the time of the imaging, an aperture value is set to the minimum or close to the minimum of the aperture, which is not figured herein, and the focus lens 2a is configured to be driven so as to correspond to a hyperfocal distance. This enables the depth of field to be made deepened, and the focused image data, even if it is the moving subject (the feature region), to be widely obtained. And, since the lens 2 is not needed to be driven, decreasing power consumption for the digital camera 1 is made possible.

The focus lens 2a is configured to be fixed after being driven to the position corresponding to a hyperfocal distance, and to be driven to the focus position to the subject at the time of imaging. This enables the lens 2 to be efficiently driven to the focus position, and the AF processing to be increased in speed.

The exposure conditions for the digital camera 1 is be modified according to the motion of the subject at the time of imaging. This enables imaging under the optimized exposure conditions to the subject.

The embodiment can be modified as follows.

At the step S102 in FIG. 3, the example of the person being selected as the category of the subject is described; while, the example of a soccer ball being selected as the category of the subject is described hereinafter. A method for recognizing and determining the soccer ball as the feature region is described hereinafter. The other parts are as described above in accordance with the embodiment.

The method for recognizing the soccer ball includes a method that a round-shaped region candidate corresponding to the shape of the soccer ball is extracted from the image data, and the soccer ball is determined from within the region, and a method that color is detected from the image data. In addition, the soccer ball may as well be recognized by combining these methods.

The method for recognizing the soccer ball by detecting color from the image data is hereat described. Supposing that the soccer ball is made up with two colors, black and white, the soccer ball is recognized by extracting the region that is made up with the two colors, black and white, from the image data. The region ratio of black and white, which makes up the soccer ball, is negligible even if it is seen from any viewpoint. Therefore, the region ratio of black and white is registered in advance. Then, the region that corresponds to the registered region ratio of black and white is extracted.

The shape of the feature region may as well be user-settable. As the step S102 in FIG. 3, once the soccer ball is selected as category of the subject, a selection tool that corresponds to the shape of the soccer ball, for example a round-shaped frame, is displayed with overlapping with the through image. The size of the selection tool can be adjusted by operating the arrow key 22: the user adjusts the size of the selection tool to the size of the soccer ball displayed on the through image. After adjusting the size of the selection tool, the user's pressing down the enter button 23 causes the size of the selection tool fixed. The selection tool, after its size is fixed, can be moved in the vertical direction and the horizontal direction by operating the arrow key 22. The user superimposes the selection tool on the soccer ball displayed on the through image. Once the position of the selection tool is adjusted, pressing down the enter button 23 causes the soccer ball to be registered as the feature region.

In accordance with the example of modification, which is described above, the following operational effects can be achieved.

The method for recognizing the soccer ball from the image is configured to include registering the color region ratio specific to the feature region in advance and detecting the feature region that corresponds to the color region ratio, in addition to extracting the round-shaped region and detecting particular colors from the image data. This improves the accuracy of recognizing the feature region from the image data.

The selection tool is displayed according to the category for the selected subject, and is configured to be user-adjustable to the size and the position of the feature region. This enables the feature region to be designated, even if the subject whose feature region is difficult to be recognized from the image data.

The Second Embodiment

The second embodiment of the present invention is described hereinafter.

In accordance with the first embodiment, the feature region for focusing is designated from the feature region that is recognized on the through image; on the other hand, in accordance with the second embodiment, the feature region for focusing is designated in advance from the image data that is saved in the memory card 15, etc.

Figure 6:
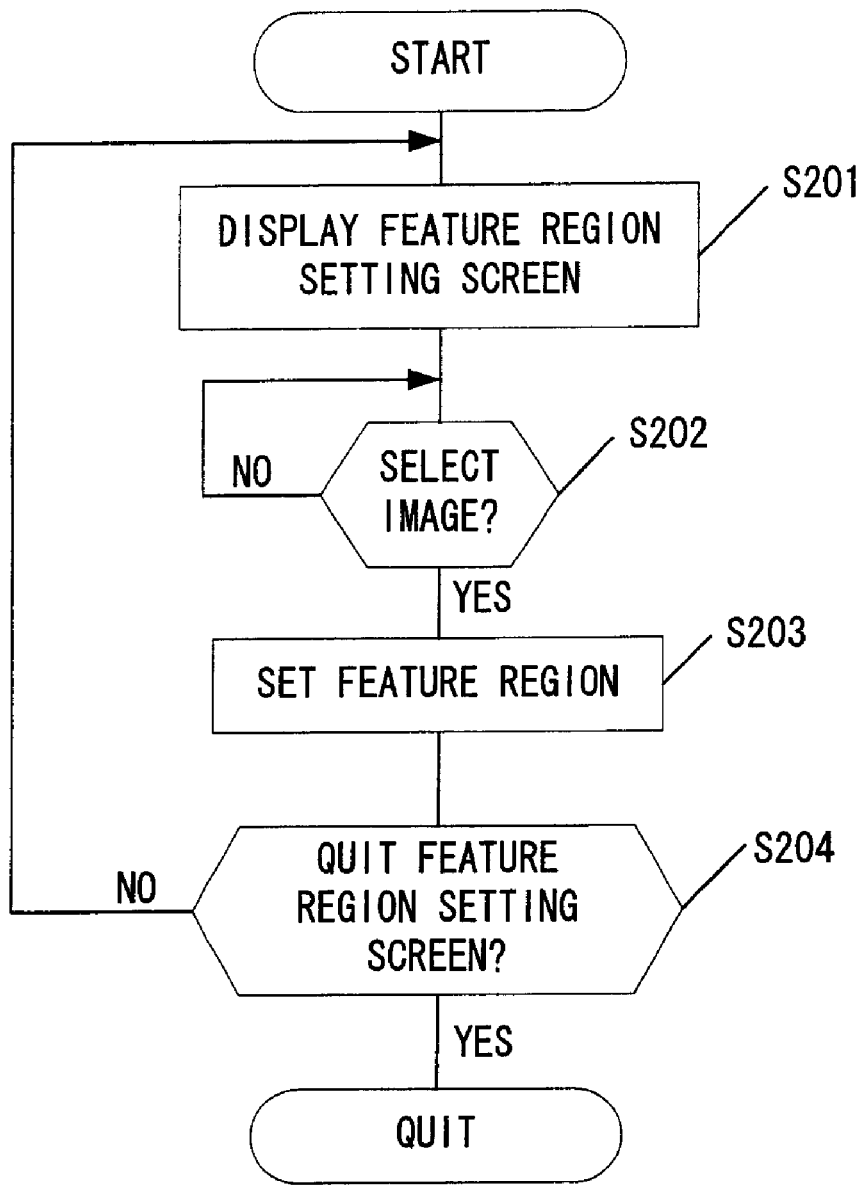
FIG. 6 is a flow chart that shows a procedure of setting for a feature region from image data in accordance with a second embodiment of the present invention.

The basic configuration of the digital camera in accordance with the second embodiment is the same as that in accordance with the first embodiment. Differences from the first embodiment are described hereinafter. FIG. 6 is a flow chart that shows processing procedure for setting a feature region based on the image data that is saved in the memory card 15, etc. The processing shown in FIG. 6 is executed by the control unit 5, etc.

While the power button 19 of the digital camera 1 is ON, if a setup mode is selected by the user's operating a mode dial, which is not figured herein, a setup menu screen is displayed on the display unit 17. There exists an item of "predictive AF" for settings for the predictive AF mode, among a variety of menu items related to imaging and reproducing that are displayed on the setup menu screen. The user's operating the arrow key 22 causes the item of "predictive AF" to be selected. The user's pressing down the enter key 23 causes the item of "predictive AF" to be determined. Then, a predictive AF menu screen is displayed on the display unit 17.

There exists an item of "feature region setting" for designating a feature region for imaging in the predictive AF mode, among a variety of menu items related to the predictive AF mode that are displayed on the predictive AF menu screen. The user's operating the arrow key 22 causes the item of "feature region setting" to be selected. The user's pressing down the enter key 23 causes the item of "feature region setting" to be determined. Then, the operation proceeds to a step S201, and a feature region setting screen is displayed on the display unit 17.

A list of the images saved in the memory card 15 is displayed on the feature region setting screen. Thumbnail images of the images saved in the memory card 15 may be displayed for the list. In the case the memory card 15 is not used, thumbnail images of the images saved in the embedded memory in the memory 11 may as well be displayed.

At a step S202, it is determined as to whether or not the thumbnail image that includes the feature region on which the user wishes to focus among the thumbnail images displayed on the display unit 17 is decided. The user's operating the arrow key 22 causes the thumbnail images to be selected. The user's pressing down the enter key 23 causes the thumbnail images to be determined. In the case where the thumbnail image is not decided, the operation repeats the determination at the step S202 until the thumbnail image is determined. In the case where the thumbnail image is determined, the operation proceeds to a step S203.

Once the thumbnail image is determined, at the step S203, an image that corresponds to the thumbnail image is reproduced and displayed on the display unit 17. At this time, an image for selecting category of the subject to be recognized is superimposed on the through image and displayed on the display unit 17. Once the category of the subject is selected, the selection tool that corresponds to the shape of the subject is superimposed on the through image and displayed. For example, if a person is selected as the category of the subject, an elliptical-shaped selection tool with vertical major axis is displayed. Then, the user's operating both the arrow key 22 and the enter key 23 causes the size and the position of the selection tool to be adjusted for setting the feature region. Since detail for setting the selection tool is same as that in the example of modification in accordance with the first embodiment, description is skipped herein.

At a step S204, whether or not an instruction for quitting the feature region setting screen exists. In the case where the feature region setting screen is not quitted, the operation returns to the step S201, and the feature region setting screen is displayed on the display unit 17 again. For example, if the user operates the operation unit 18 and selects quitting the feature region setting screen for quitting the feature region setting screen, the setting for the feature region terminates. In the case where, after the setting for the feature region, imaging the subject is to be performed, the operation proceeds to processing that is shown in FIG. 7.

In accordance with the embodiment, the feature region is set using only one image data. However, the feature region may as well be settable using a plurality of image data to the same subject. For example, in the case that the category of the subject is a person, that is, the face is designated as the feature region, the feature region is settable using not only the image data that includes a front view of the face but also the image data that includes an angled view of the face such as a profile. In the case that the feature region is set using a plurality of image data to the same subject, the plurality of image data are configured to be related to each other. Method for relating the image data to each other includes, for example, a method in which the user inputs the same keyword into the image data to be related at saving.

Not just one subject is set for the feature region, but a plurality of subjects may as well be set for the feature regions.

Figure 7:
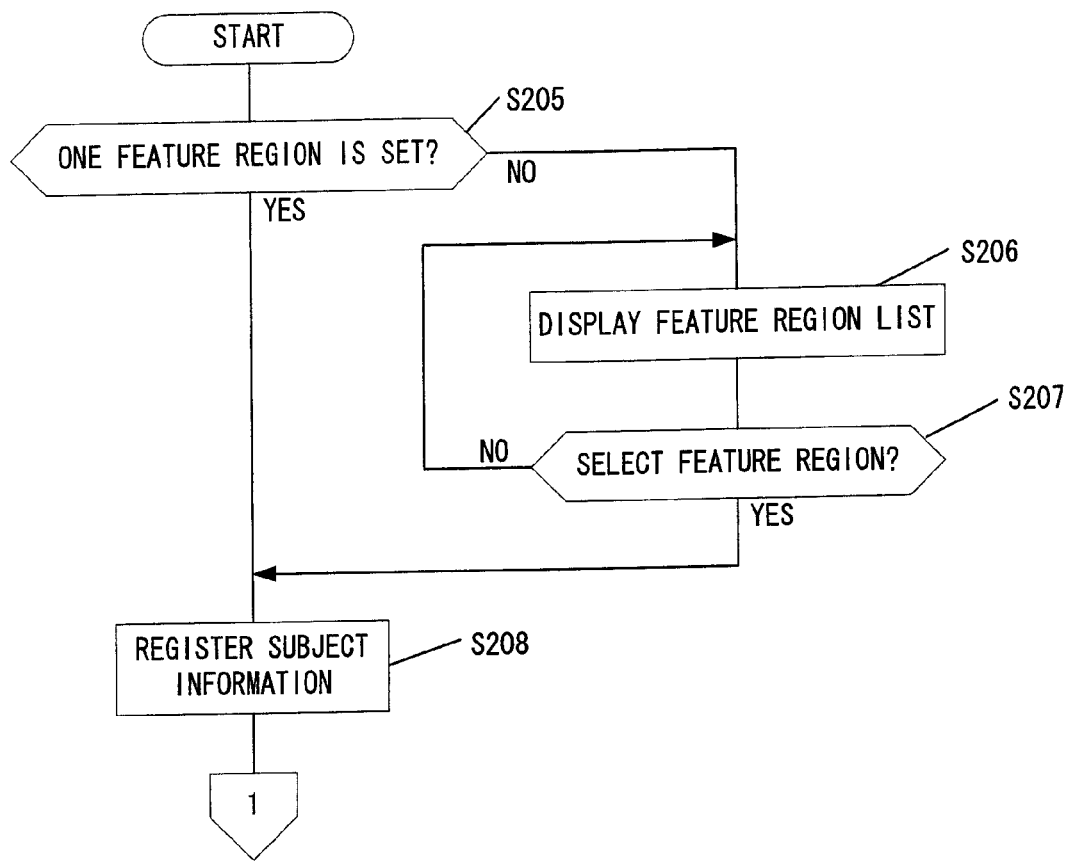
FIG. 7 is a flow chart that shows a photographing procedure in the predictive AF mode in the case where feature region is set from image data in accordance with the second embodiment of the present invention.

FIG. 7 is a flow chart that shows photographing procedure in the predictive AF mode in the case where feature region has already been set from image data.

If the AF mode selection switch 24 is switched ON with the power button 19 of the digital camera 1 switched ON, at a step S205, whether or not only one feature region has been set from the image data is determined. In the case where only one feature region has been set from the image data, the operation proceeds to a step S208. In the case where, on the other hand, a plurality of feature regions have been set from the image data, the operation proceeds to a step S206 and the list of the set feature regions is displayed. With reference to displaying the list, the thumbnail images that includes the set feature regions may be displayed; or, the keywords that are registered in the images that includes the set feature regions may as well be displayed.

At a step S207, whether or not one feature region is selected from the list of the set feature regions is determined. In the case where any feature region is not selected, determination at the step S207 is repeated until a feature region is selected. In the case where a feature region is selected, the operation proceeds to the step S208.

At the step S208, information about the set subject is registered in the memory 11. The information about the set subject includes position information of the lens 2 at the time of imaging, distance (subject distance) to the subject calculated according to the position information of the lens 2, and the size of the feature region. These information are recorded in the images in Exif format. The size of the feature region is the size of the selection tool determined at the step S203.

In the case where, for example, the selection tool is elliptical-shaped, the size of the feature region is designated to be either the length of the major axis of the ellipse (the line segment that passes through the two foci of the ellipse and terminates on the ellipse), the length of the minor axis of the ellipse (the line segment that passes through the center perpendicular to the major axis, and terminates on the ellipse), or the combination of the length of the major axis of the ellipse and the length of the minor axis of the ellipse. Thus, the control unit 5 reads out the information about the subject from the image, and saves the same in the embedded memory in the memory 11.

Once the information about the subject is registered at the step S208, the operation proceeds to the step S110 of FIG. 3. Since subsequent steps are same as those in accordance with the first embodiment, description is skipped herein.

In accordance with the embodiment, which is described above, the following operational effects can be achieved.

The feature region desired to be focused on is designated from the image data saved in the memory card 15, etc. This enables the user to designate the feature region for focusing in advance of the imaging, and to perform imaging immediately after starting up the digital camera 1.

The feature region is be designated using a plurality of image data to the same subject. This improves the accuracy of recognizing the subject.

The Third Embodiment

The third embodiment of the present invention is described hereinafter.

In accordance with the first embodiment, in response to the operation of the enter key 23 by the user, the feature region desired to be focused on is designated, and the information about the subject is registered; in accordance with the third embodiment, meanwhile, the designation of the feature region and the registration of the information about the subject are performed automatically.

Figure 8:
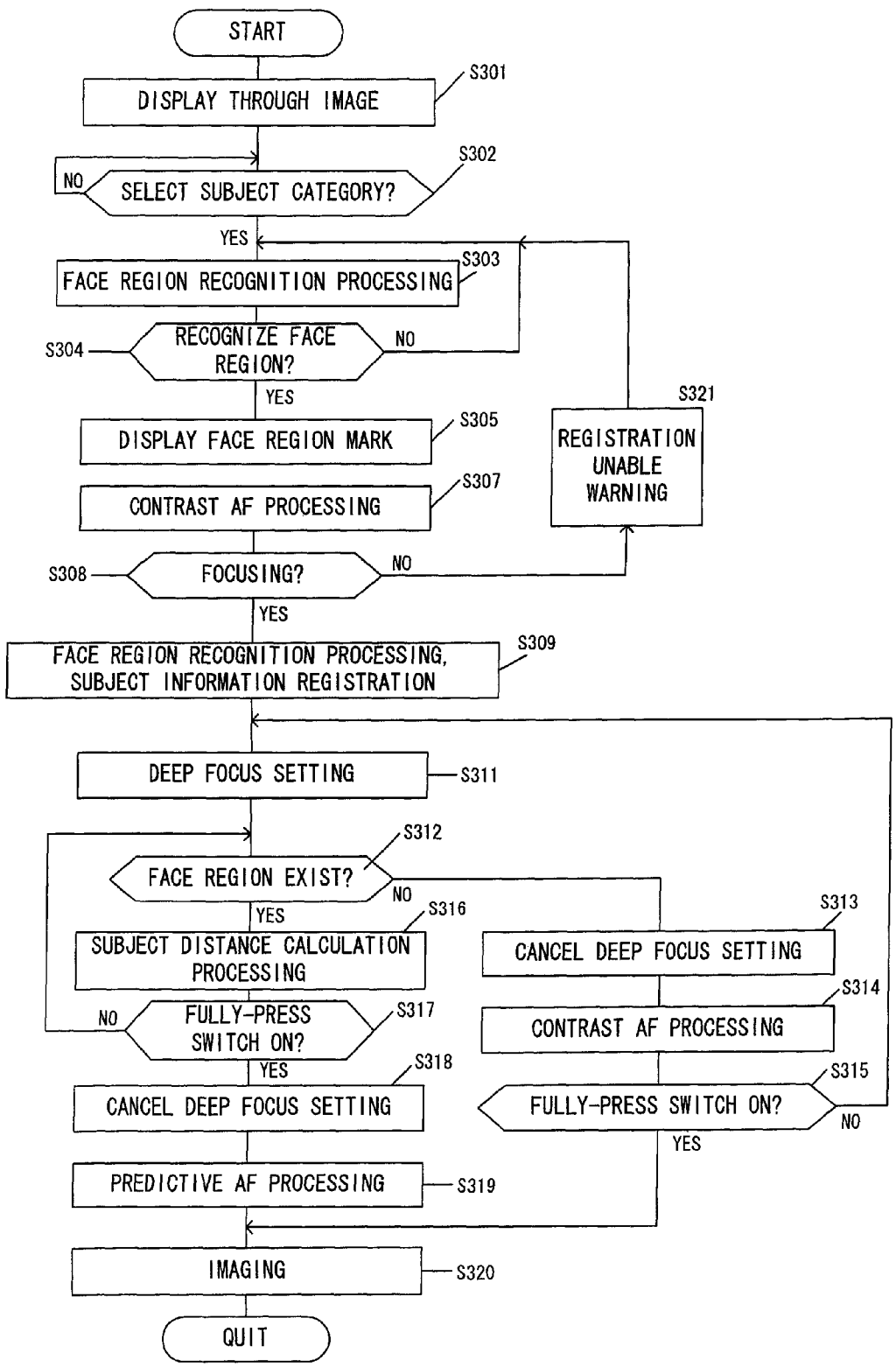
FIG. 8 is a flow chart that shows a photographing procedure in the predictive AF mode in accordance with a third embodiment of the present invention.

The basic configuration of the digital camera in accordance with the third embodiment is the same as that in accordance with the first embodiment. Differences from the first embodiment are described hereinafter. Photographing procedure in the predictive AF mode in accordance with the third embodiment is described using the flow chart in FIG. 8. The processing shown in a flow chart in FIG. 8 is executed by the control unit 5, etc.

At a step S301, if the AF mode selection switch 24 is switched ON, the through image is displayed on the display unit 17. At a step S302, category of the subject is to be selected. The case where the person is selected as category of the subject is described hereinafter.

Once the category of the subject to be recognized is selected, at a step S303, the control unit 5 sends the feature region recognition calculation unit 25 an instruction for initiating the feature region recognition processing to the through image. Here, since the person is selected as the category of the subject at the step S302, the face region recognition processing, in which a face of a person is recognized as the feature region, is initiated.

At the step S304, the control unit 5 determines whether or not the face region has been recognized, in response to a result of the face region recognition at that time from the feature region recognition calculation unit 25. In the case where the face region is not recognized, the operation returns to the step S303, and performs the face region recognition processing again. In the case where the face region is recognized, the operation proceeds to the step S305. In the case where a plurality of the face regions are recognized, the largest face region is selected automatically among the plurality of the recognized face regions. Then, the operation proceeds to the step S305. Otherwise, a region that lies in the closest position to the center of the screen may as well be selected automatically among the plurality of the face regions.

At the step S305, the face region mark that indicates the recognized face region is superimposed on the through image and displayed on the display unit 17. The face region mark indicates the face region whose subject information is to be registered. The face region mark is, for example, made to be a rectangular frame as shown in FIG. 2, and is displayed, for example, in white.

After designating the face region that is to be registered, the operation proceeds to a step S307. At the step S307, in response to the ON signal of the halfway-press switch SW1, the contrast AF processing is performed to the designated face region. At a following step S308, whether or not the designated face region has been focused is determined. If the face region is determined to have been focused, the operation proceeds to a step S309. At the step S309, the face recognition processing is performed over again, in a condition that the subject is focused accurately. The subject information at this condition is registered in the memory 11. Focusing on the designated face region causes the display color of the face region mark to be changed so as to indicate that the face region has been focused. The face region mark displayed in white, for example, is changed into that in green after the focusing. Otherwise, the face region mark may as well be configured to be flashed after the focusing.

If the face region is determined, on the other hand, not to have been focused at the step S308, the operation proceeds to a step S321, and the user is informed that the subject information is unable to be registered. A warning of being non-registrable includes, for example, displaying a warning on the display unit 17, or turning a warning light on.

Thus, after the recognition of the face region and the registration of the subject information are performed automatically, the operation proceeds to a step S311. Since the processing at the steps S311 to S320 are the same as the processing at the steps S111 to S120 in accordance with the first embodiment, description is skipped here.

In accordance with the third embodiment, which is described above, the designation of the feature region and the registration of the subject information are performed easily.

The Fourth Embodiment

The fourth embodiment of the present invention is described hereinafter.

In accordance with the first embodiment, the deep focus setting is made at displaying the through image in response to the operation for the halfway-press switch SW1. In accordance with the fourth embodiment, on the other hand, in the case where the selected face region exists on the through image, the predictive AF processing is performed so that the face region's motion is predicted and focused.

Figure 9:
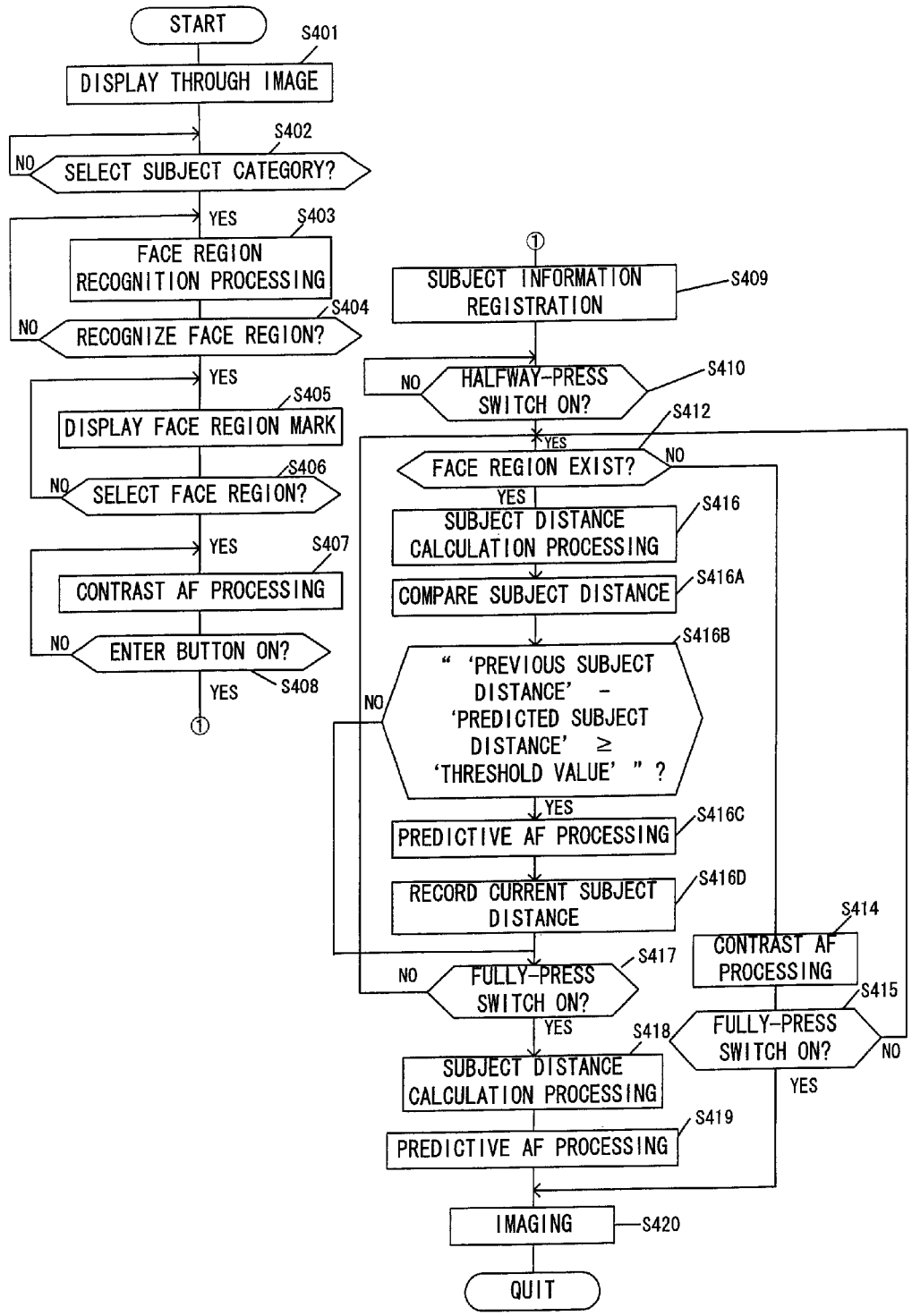
FIG. 9 is a flow chart that shows a photographing procedure in the predictive AF mode in accordance with a fourth embodiment of the present invention.

The basic configuration of the digital camera in accordance with the fourth embodiment is the same as that in accordance with the first embodiment. Differences from the first embodiment are described hereinafter. Photographing procedure in the predictive AF mode in accordance with the fourth embodiment is described using a flow chart in FIG. 9. The processing shown in the flow chart in FIG. 9 is executed by the control unit 5, etc.

Since the processing at steps S401 to S409 are the same as the processing at the steps S101 to S109 in accordance with the first embodiment, description is skipped here.

At a step S410, whether or not the halfway-press switch SW1 of the release button 20 is ON is determined. If the halfway-press switch SW1 of the release button 20 is OFF, the determination of the step S410 is repeated until the halfway-press switch SW1 is turned ON. If the halfway-press switch SW1 of the release button 20 is ON, the operation proceeds to a step S412.

At a step S412, whether or not the face region registered at the step S409 exists in the through image is determined. In the case where the registered face region does not exist in the through image, the operation proceeds to a step S414. At the step S414, the conventional contrast AF processing is performed. At a step S415, whether or not the fully-press switch SW2 of the release button 20 is ON is determined. If the fully-press switch SW2 is OFF, the operation returns to the step S412. If the fully-press switch SW2 is ON, the operation proceeds to a step S420.

In the case where the registered face region exists in the through image at the step S412, on the other hand, the face region mark is displayed to the registered face region; then, the operation proceeds to a step S416, and the subject distance calculation processing is performed. The control unit 5 calculates the current subject distance according to information about the size of the face region mark and the focal length of the lens 2. Furthermore, the subject distance after a predetermined period of time is predicted, as in accordance with the first embodiment, which is described above.

At a following step S416A, the previous subject distance calculated upon a previous period and recorded in the memory 11 is compared with the subject distance after the predetermined period of time calculated at the step S416. For the predetermined period of time, a proper value is set in advance in consideration of delay of the control that occurs in the control unit 5. The predetermined time may as well be set as the same value as the release time lag, which is described above.

At a step S416B, if the difference between the previous subject distance and the predicted subject distance (="previous subject distance"−"predicted subject distance") is determined to be equal to or more than a threshold value, the operation proceeds to the step S416C. If ("previous subject distance"-"predicted subject distance") is determined to be less than the threshold value, the operation proceeds to a step S417. The threshold value, which is a value that the face of the subject corresponds to the registered face region is not blurred on the through image even if the subject distance changes, is to be set properly in advance. Rate of change of the subject distance may as well be set for the threshold value. In the case where the subject distance is short, the threshold value may as well be set to be smaller than that in the case of long distance.

At the step S416C, the predictive AF processing is performed to the subject. A focus position of the subject after a predetermined period of time is predicted based on the subject distance after the predetermined time period calculated in the step S416 and the focus lens 2a is moved so as to focus on the predicted focus position. At a step S416D, the subject distance of a current period that is calculated at the step S416 is recorded in the memory 11.

At the step S417, whether or not the fully-press switch SW2 of the release button 20 is ON is determined. If the fully-press switch SW2 of the release button 20 is OFF, the operation returns to the step S412 in which whether or not the registered face region exists in the through image is again determined. If the fully-pressed switch SW2 of the release button 20 is ON, the operation proceeds to a step S418.

At the step S418, the subject distance is calculated with respect to the registered face region, and after, at a step S419, the predictive AF is performed on the subject, the imaging is performed with the image sensor 8 at a step S420.

In accordance with the fourth embodiment, which is described above, the previous subject distance and the predicted subject distance are compared to each other at displaying the through image. If the image of the subject's face that corresponds to the face region designated on the through image is predicted to be blurred, the predictive AF processing is performed to the designated face region. This enables displaying the through image that is accurately focused on the moving subject if necessary.

The second embodiment, which is described above, may as well be combined with the third or the fourth embodiment. Or, the third embodiment and the fourth embodiment may as well be combined to each other.

The above-described embodiments are examples, and various modifications can be made without departing from the scope of the invention.

What is claimed is:

1. A digital camera, comprising:
   an imaging unit that receives and images a light from a subject transmitted to a photographing optical system;
   a recognition unit that recognizes a feature region of the subject using an image obtained by imaging with the imaging unit;
   a detection unit that detects a size of the feature region that is recognized with the recognition unit;
   a distance calculation unit that calculates a distance to the subject according to the size of the feature region; and
   a speed calculation unit that calculates a moving speed of the subject according to a temporal change of the distance to the subject, and
   a control unit that predicts a distance to the subject after a predetermined period of time according to the size of the feature region,
   wherein the control unit predicts the distance to the subject based on the distance to the subject calculated with the distance calculation unit and the moving speed of the subject calculated with the speed calculation unit, and controls the photographing optical system so as to focus on the subject, and
   wherein the imaging unit, the recognition unit, the distance calculation unit, the speed calculation unit and the control unit are all part of a single same digital camera.

2. A digital camera according to claim 1, wherein:
   the distance calculation unit calculates the distance to the subject based on position information of a lens that constitutes the photographing optical system, and after calculating the distance to the subject based on the position information of the lens that constitutes the photographing optical system, calculates the distance to the subject from both the distance to the subject that is calculated and the size of the feature region.

3. A digital camera according to claim 1, wherein:
   the control unit predicts the distance to the subject at a time of imaging based on a period of time between a time at which an operation is performed to execute photography and a time at which the imaging unit actually performs imaging, and controls the photographing optical system so as to focus on the subject at the time of imaging with the imaging unit.

4. A digital camera according to claim 3, wherein:
   a photographing condition is modified in response to a calculation result of one of the distance calculation unit and the speed calculation unit.

5. A digital camera according to claim 4, wherein:
   the photographing condition is one of shutter speed and ISO speed.

6. A digital camera according to claim 1, further comprising:
   a registration unit that selects the feature region of the subject for predicting the distance to the subject, from at least one said feature regions that are recognized with the recognition unit, and registers feature information of the selected feature region of the subject; wherein:
   after registration of the selected feature information of the feature region of the subject, the recognition unit recognizes the feature region of the subject based on the registered feature information of the feature region of the subject.

7. A digital camera according to claim 6, further comprising:
   a record control unit that stores an image that is obtained by imaging with the imaging unit in a recording medium, wherein:
   the registration unit registers the feature information of the feature region of the subject based on the image that is stored in the recording medium.

8. A digital camera according to claim 6, wherein:
   the feature information of the feature region includes at least one of position information of a lens that constitutes the photographing optical system, the distance to the subject, and the size of the feature region.

9. A digital camera according to claim 1, wherein:
   the control unit predicts the distance to the subject after the predetermined period of time based on sizes of a plurality of the feature regions, which exist on a plurality of images obtained in chronological order with the imaging unit.

10. A digital camera, comprising:
    an imaging unit that receives and images a light from a subject transmitted to a photographing optical system;
    a recognition unit that recognizes a feature region of the subject using an image obtained by imaging with the imaging unit;

a detection unit that detects a size of the feature region that is recognized with the recognition unit;

a control unit that predicts a distance to the subject after a predetermined period of time according to the size of the feature region, and controls the photographing optical system so as to focus on the subject, wherein the control unit predicts the distance to the subject at a time of imaging based on a period of time between a time at which an operation is performed to execute photography and a time at which the imaging unit actually performs imaging, and controls the photographing optical system so as to focus on the subject at the time of imaging with the imaging unit; and a registration unit that selects the feature region of the subject for predicting the distance to the subject, from at least one said feature regions that are recognized with the recognition unit, and registers feature information of the selected feature region of the subject, wherein after registration of the selected feature information of the feature region of the subject, the recognition unit recognizes the feature region of the subject based on the registered feature information of the feature region of the subject.

11. A digital camera according to claim 10, further comprising:

a distance calculation unit that calculates a distance to the subject according to the size of the feature region; and a speed calculation unit that calculates a moving speed of the subject according to a temporal change of the distance to the subject, wherein:

with the distance calculation unit and the speed calculation unit being present, the control unit predicts the distance to the subject based on the distance to the subject calculated with the distance calculation unit and the moving speed of the subject calculated with the speed calculation unit.

12. A digital camera according to claim 11, wherein:

the distance calculation unit calculates the distance to the subject based on position information of a lens that constitutes the photographing optical system, and after calculating the distance to the subject based on the position information of the lens that constitutes the photographing optical system, calculates the distance to the subject from both the distance to the subject that is calculated and the size of the feature region.

13. A digital camera according to claim 10, further comprising:

a record control unit that stores an image that is obtained by imaging with the imaging unit in a recording medium, wherein:

the registration unit registers the feature information of the feature region of the subject based on the image that is stored in the recording medium.

14. A digital camera according to claim 10, wherein:

the feature information of the feature region includes at least one of position information of a lens that constitutes the photographing optical system, the distance to the subject, and the size of the feature region.

15. A digital camera according to claim 10, wherein:

a photographing condition is modified in response to a calculation result of one of the distance calculation unit and the speed calculation unit.

16. A digital camera according to claim 15, wherein:

the photographing condition is one of shutter speed and ISO speed.

17. A digital camera according to claim 10, wherein:

the control unit predicts the distance to the subject after the predetermined period of time based on sizes of a plurality of the feature regions, which exist on a plurality of images obtained in chronological order with the imaging unit.

* * * * *